United States Patent [19]
Jacobson et al.

[11] Patent Number: 5,129,544
[45] Date of Patent: Jul. 14, 1992

[54] LAMINATED FUEL TANK STRUCTURE

[76] Inventors: Wendell L. Jacobson, 21420 Broadstone Rd., Harper Woods, Mich. 48225; Thomas R. McCulloch, 1883 Wingate Rd., Bloomfield Hills, Mich. 48302; Dudley L. McCully, 747 Fieldstone Dr., Rochester Hills, Mich. 48309

[21] Appl. No.: 610,531

[22] Filed: Nov. 8, 1990

[51] Int. Cl.$^5$ .............................................. B65D 6/02
[52] U.S. Cl. .................................. 220/562; 220/4.14; 220/453; 220/678; 220/563; 428/35.8
[58] Field of Search .................... 220/562, 563, 4.14, 220/4.13, 453, DIG. 29, 678, 680; 428/35.8, 35.9

[56] References Cited

U.S. PATENT DOCUMENTS

| | | | |
|---|---|---|---|
| 3,604,719 | 9/1971 | Kerr | 220/562 |
| 3,606,958 | 9/1971 | Coffman | 220/453 |
| 3,655,086 | 4/1972 | Ternner | 220/450 |
| 3,760,971 | 9/1973 | Sterrett | 220/435 |
| 3,779,420 | 12/1973 | Knaus | 220/453 |
| 3,912,107 | 10/1975 | Baumann | 220/563 |
| 4,013,190 | 3/1977 | Wiggins et al. | 220/563 |
| 4,032,608 | 6/1977 | Zinniger et al. | 220/450 |
| 4,144,438 | 3/1979 | Gelman et al. | 220/450 |
| 4,170,877 | 10/1979 | Pickering | 220/563 |
| 4,309,466 | 1/1982 | Stillman | 220/453 |
| 4,357,027 | 11/1982 | Zeitlow | 220/4.14 |
| 4,401,309 | 8/1983 | Matsuzaki et al. | 220/4.14 |
| 4,453,564 | 6/1984 | Bergesio | 220/563 |
| 4,753,368 | 6/1988 | Lescaut | 220/DIG. 29 |
| 4,916,031 | 4/1990 | Kitamura et al. | 220/680 |

FOREIGN PATENT DOCUMENTS

| | | | |
|---|---|---|---|
| 233681 | 8/1987 | European Pat. Off. | 220/562 |
| 2045961 | 3/1972 | Fed. Rep. of Germany | 220/450 |
| 3213070 | 11/1982 | Fed. Rep. of Germany | 220/563 |
| 3534095 | 4/1987 | Fed. Rep. of Germany | 220/450 |
| 290787 | 6/1965 | Netherlands | 220/562 |

*Primary Examiner*—Stephen Marcus
*Assistant Examiner*—S. Castellano
*Attorney, Agent, or Firm*—Gifford, Groh, Sprinkle, Patmore and Anderson

[57] ABSTRACT

A novel fuel tank is disclosed for a vehicle. The fuel tank includes a first and second housing part, each having an outer peripheral flange. The flanges are adapted to abut against each other and, in doing so, form a chamber between the central portions of the housing parts. These flanges are then sealingly secured together. Each housing part is a laminate structure having an outer layer constructed of an abrasion and impact resistant material, a vapor barrier layer constructed of a material impervious to hydrocarbon vapors, and a chemically resistant layer constructed of a material resistant to erosion from hydrocarbons and conventional fuel additives. Each housing part may also have additional layers, such as a heat and light reflective layer adjacent the outermost abrasion resistant layer, as well as a structural layer to add strength and rigidity to the overall tank. Additional structures, such as reservoirs, baffles, support structures, filler tube extensions, valving and the like can also be contained within the interior of the fuel tank.

28 Claims, 2 Drawing Sheets

LAMINATED FUEL TANK STRUCTURE

BACKGROUND OF THE INVENTION

I. Field of the Invention

The present invention relates generally to vehicular fuel tanks and, more particularly, to such a fuel tank using a laminate structure for the fuel tank housing.

II. Description of the Prior Art

In one type of previously known fuel tank for a vehicle, the fuel tank is formed from two housing parts or halves which are formed from stamped metal. Each housing part includes outer peripheral flanges and the flanges are adapted to abut against each other. In doing so, a housing chamber is formed between the housing part which ultimately holds the fuel. These housing parts are then welded together thereby forming the fuel tank.

One disadvantage of this previously known fuel tank is that the stamped metal housing parts are relatively heavy and increase the overall weight of the vehicle. Additionally, in view of increased use of alternate fuels, such as methanol and gasohol, it may be necessary to construct such fuel tanks with higher corrosion resistant materials, such as stainless steel. That, in turn, increases not only the cost of material for the fuel tank, but also the manufacturing cost for the tank.

A still further disadvantage of these previously known fuel tanks is that the fuel tank, once constructed by welding the housing halves together, is relatively bulky for its weight and requires expensive tooling which is typically performed at a single location. This disadvantageously increases the shipping costs and handling costs for such fuel tanks.

There have, however, been previously known fuel tanks for vehicles made from synthetic materials, such as plastics. In one previously known fuel tank of synthetic material, the fuel tank is formed by blow molding the fuel tank from plastic. These previously known fuel tanks constructed by blow molding, however, are disadvantageous in several different respects.

One disadvantage of these blow molded fuel tanks is that the fuel tank lacks the rigidity and strength that is desirable in many applications.

A still further disadvantage of these previously known blow molded fuel tanks is that it is difficult and expensive to include other structures within the interior of the fuel tank. Such other structures include, for example, reservoirs, anti-slosh baffles, valving for emission controls, filler neck extensions and the like.

A still further disadvantage of these previously known blow molded fuel tanks is that the fuel tank, after construction, is bulky and relatively lightweight in construction. The bulkiness of these previously known fuel tanks due to their empty interior, results in high shipping, transportation and handling costs for the fuel tanks.

SUMMARY OF THE PRESENT INVENTION

The present invention provides a laminated fuel tank which overcomes all of the above mentioned disadvantages of the previously known devices.

In brief, the fuel tank of the present invention comprises a first and second housing part, each having an outer peripheral flange. The flanges are adapted to flatly abut against each other so that a chamber is formed between the central portions of the housing parts. This housing chamber thus forms the fuel tank and is adapted to receive fuel.

The outer flanges of the fuel tank are sealingly secured together. Any conventional means, such as solvent welding, laser welding, adhesive welding, sonic welding, and/or heat welding can be used to seal and secure the flanges together.

Since the fuel tank is constructed from two housing parts, the fuel tank can be shipped disassembled from one manufacturing facility to a place at or adjacent the manufacturer of the vehicle. In doing so, the housing parts can be nested within each other thus reducing the shipping and transportation costs.

Additional structures, such as reservoirs, baffles, filler neck extensions, valving for emission controls, and the like can also be positioned within the interior of the housing chamber prior to sealingly securing the flanges together.

Each housing part is a laminate structure comprising an outer layer constructed of a material resistant to impact and abrasion. Preferably, the outer layer is constructed from transparent or translucent plastic, nylon 12, mylar, teflon or the like.

A metallic foil layer is then positioned immediately inside of the outermost layer. This foil layer reflects both heat and light from the interior of the fuel tank thereby reducing the overall temperature of the fuel in the fuel tank.

A vapor barrier layer constructed of a material impervious to hydrocarbon vapors forms a further layer of the laminate structure for the housing parts. A thin layer of teflon is preferably employed as the vapor barrier layer.

Each laminate structure further comprises a chemical resistant layer constructed of a material which is resistant to erosion from hydrocarbons as well as conventional fuel additives. Nylon 12 as well as teflon are both materials that can be used as the chemical resistant layer since both nylon 12 and teflon are chemically resistant to hydrocarbons.

The laminate structure may also include a structural layer which enhances the strength and rigidity of the completed fuel tank. The structural layer may consist of nylon 6, polyethylene, polypropylene as well as other synthetic materials.

In practice, the laminate structure is formed by laminating the various sheets of material together in order to form the laminate structure. Preferably, the layers are joined together by applying both heat and pressure to the various layers forming the laminate although, in some cases, an adhesive may also be required.

After the sheets for the laminate structure are bonded together, the first and second housing parts are stamped or otherwise formed from the laminate sheets using conventional stamping methods and equipment. The housing parts are then nested together and shipped to the appropriate location for final assembly. Furthermore, during final assembly, additional internal structures, such as reservoirs, baffles, emissions valving, filler neck extensions, and the like may be positioned within the chamber formed between the housing parts prior to sealing the housing part flanges together.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
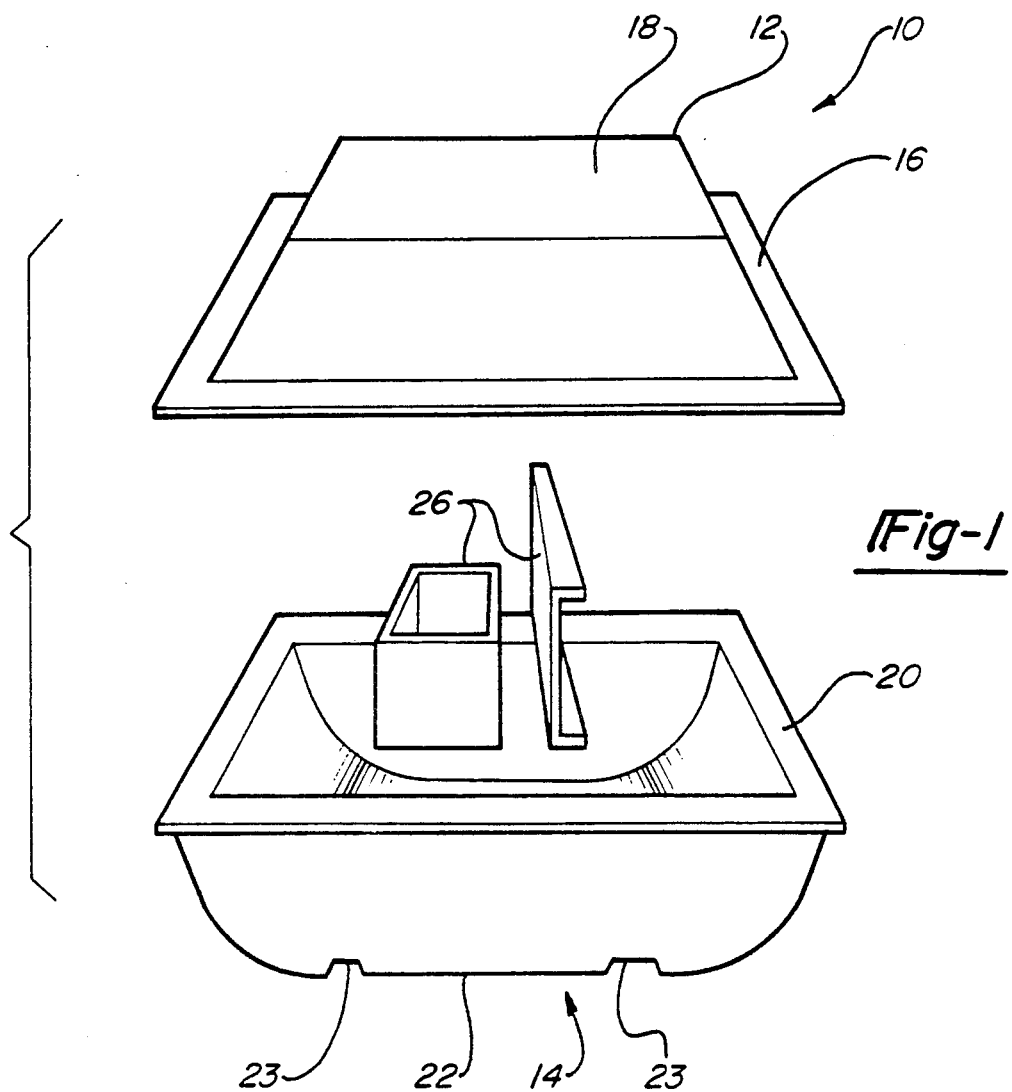
FIG. 1 is an exploded view illustrating a preferred embodiment of the present invention.

With reference first to FIG. 1, a preferred embodiment of the fuel tank 10 of the present invention is thereshown and comprises a first or upper housing part 12 and a second or lower housing part 14.

The first or upper housing part 12 includes an outer peripheral flange 16 as well as a central portion 18 extending between the flange 16. The central portion 18, furthermore, is offset from the peripheral flange 16 as shown in FIG. 1. Similarly, the second or lower housing part 14 includes an outer peripheral flange 20 and a central housing portion 22 extending between and offset from the flange 20. One or more indentations 23 for receiving the fuel tank holding straps (not shown) are preferably formed in the outer surface of the lower housing part 14.

Figure 2A:
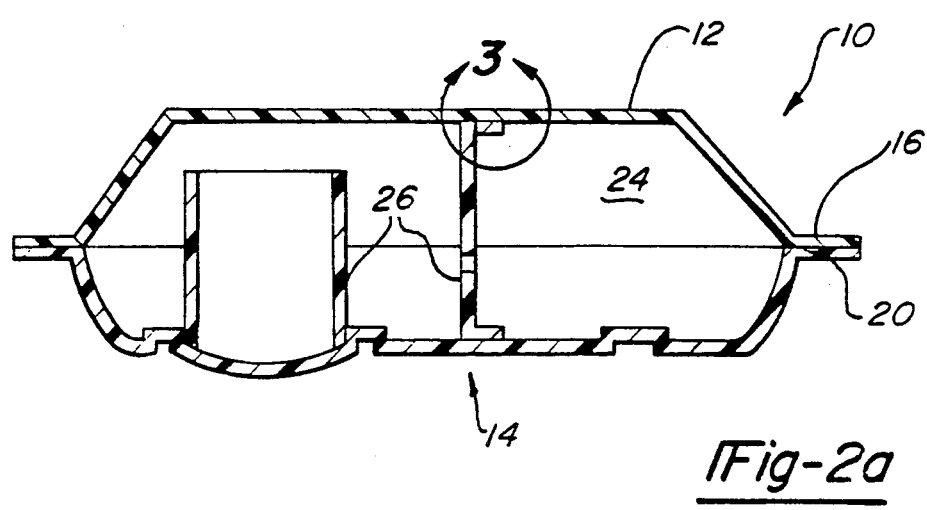
FIGS. 2A and 2B are cross-sectional views illustrating alternate embodiments of an assembled fuel tank.

Referring now to FIG. 2A, the flanges 16 and 20 are adapted to flatly abut against each other so that, in doing so, a housing chamber 24 is formed between the central portions 18 and 22 of the housing parts 12 and 14. The flanges 16 and 20 are sealingly secured together to prevent leakage from the housing chamber 24. Any conventional means, such as adhesive welding, solvent welding, laser welding, sonic welding or heat welding, can be used to sealingly secure the flanges 16 and 20 together.

Figure 2B:
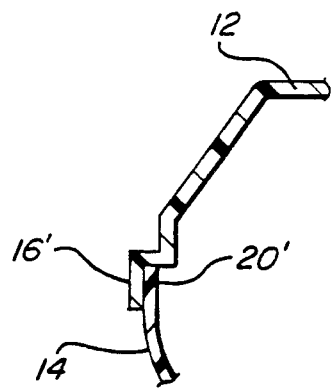

FIG. 2B depicts an alternate construction for the flanges 16 and 20 in which the flanges 16 and 20 are vertically disposed. This advantageously permits a larger volume tank to be used in the same vehicle space than a tank with a horizontal flange.

Referring now to FIGS. 1 and 2, prior to joining the housing flanges 16 and 20 together, one or more additional structures 26 can be positioned within the housing chamber 24 prior to assembling the housing parts 12 and 14 together. These additional structures can include, for example, reservoirs, baffles to control fuel slosh, support brackets for pressure or vacuum stability, filler tube extensions in order to direct fuel into a reservoir, valving for emission or vapor control, filler neck support brackets, portions of quick connect couplings, valving for liquid loss control, or the like. Such additional structures 26, illustrated diagrammatically in FIG. 2A, are positioned in one housing part 12 or 14 before the other housing part 14 or 12 is positioned over it and the flanges 16 and 20 sealingly secured together.

Figure 3:
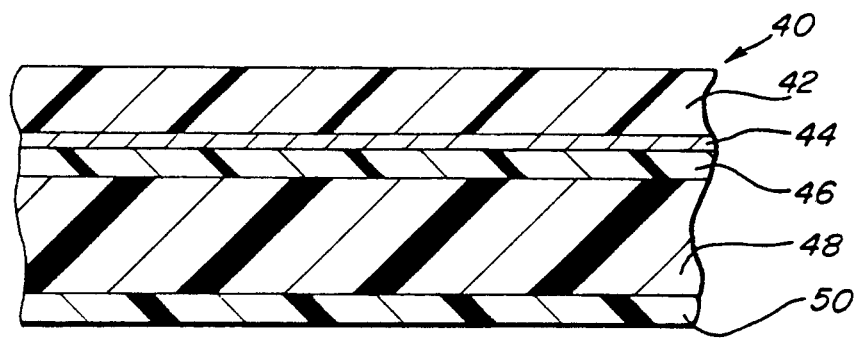
FIG. 3 is a sectional view along circle 3—3 in FIG. 2 illustrating a portion of one housing part and enlarged for clarity.

With reference now to FIG. 3, each housing part 12 and 14 comprises a laminate structure 40 depicted in FIG. 3. Furthermore, the laminate structure 40 shown in FIG. 3 shall equally apply to both the housing part 12 as well as the housing part 14.

The laminate structure 40 includes an outer layer 42 constructed of an abrasion, cut and impact resistant material. Furthermore, the layer 42 is preferably formed from a material resistant to environmental chemicals that may be present on the roads, as well as resistant to heat, flammability resistance and which is either transparent or translucent.

A number of different materials can be used for the outer layer 42. These materials include plastic, Crystalar, nylon 12, mylar, teflon as well as other materials. If desired, the outer layer 42 can also include materials for electrical conductivity. Such electrical conductivity is desirable to reduce the possibility of explosion through electrical sparks. The outer layer 42 is preferably between 10/1000 and 50/1000 of an inch thick.

Still referring to FIG. 3, the next layer, i.e. the layer immediately adjacent the outermost layer 42, is a heat and light reflective layer 44. This layer 44 is preferably formed from a metallic foil, such as aluminum foil and thus is very thin. The heat and light reflective layer 44 reflects both heat and light away from the interior of the fuel tank thus reducing the overall temperature of the interior of the fuel tank. This heat reduction in turn reduces the formation of fuel vapors. Furthermore, the heat and light reflective layer 44 may optionally only be used in the lower housing part 14.

The laminate structure 40 further includes a vapor barrier 46 which is impervious to hydrocarbon vapors. The vapor barrier layer 46 is preferably very thin, i.e. between 1/1000 and 5/1000 of an inch thick, and is preferably constructed of teflon although other materials may alternatively be used.

The laminate structure 40 further includes a structural layer 48 which increases the strength and overall rigidity of the fuel tank. The structural strength layer 48 can be constructed of nylon 6, polyethylene, polypropylene as well as other material. Furthermore, this layer 48 is relatively thick as compared to the other layers and is preferably between 20/1000 and 50/1000 of an inch thick.

The laminate structure 40 also includes a chemical resistant layer 50 which is chemically resistant, i.e. erosion resistant, to hydrocarbons as well as conventional fuel additives. This layer 50 is preferably formed from nylon 12 or teflon material and is relatively thin, i.e. from 5/1000–10/1000 of an inch thick.

Figure 4:
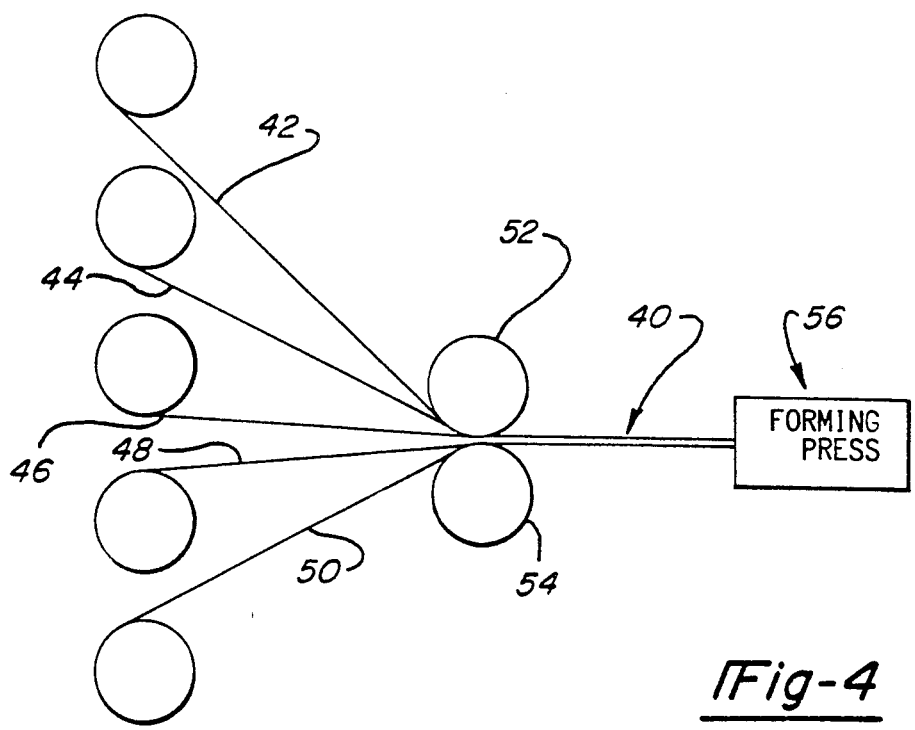
FIG. 4 is a diagrammatic view illustrating the method of constructing the laminate structure for the preferred embodiment of the present invention.

With reference now to FIGS. 3 and 4, the layers 42–50 of the laminate structure 40 are bonded together in order to form the laminate structure 40. As best shown in FIG. 4, elongated webs of the various layers 42–50 are fed through confronting rollers 52 and 54 which apply both pressure and heat to the layers 42–44 of material as they pass between the rollers 52 and 54. Preferably heat is also applied between the rollers 52 and 54 thereby bonding the layers 42–50 together. Adhesives, however, may also be required between some of the layers in order for those layers to adhere together.

Other manufacturing methods for forming the laminate structure 40 from the various layers 42–50, such as pressing the layers 42–50 together, can alternatively be used.

After the layers 42–50 exit from the rollers 52 and 54, a relatively flat sheet of laminate 40 is formed. This sheet is then stamped using conventional stamping methods at 56 in order to form both the first housing part 12 and second housing part 14. Other forming methods, such as vacuum forming, can alternatively be used.

From the foregoing, it can be seen that the laminated fuel tank of the present invention achieves many advantages over the previously known fuel tanks. One advantage of the present invention is that the overall cost for the fuel tank is substantially less than tanks with comparative properties made from stainless steel as well as relatively expensive steel alloys. Furthermore, the tooling costs to stamp the housing parts from the laminated sheet 40 is much less than that for stainless steel. This in turn, reduces the required capital investment to make the fuel tanks.

A still further advantage of the present invention over stamped stainless steel tanks is that the housing parts 12 and 14 can be nested within each other prior to shipping. This reduces the freight and transportation costs by shipping unassembled fuel tanks. Furthermore, the overall fuel tank, once assembled, is substantially less in weight than an equivalent stamped stainless steel tank.

The present invention also enjoys additional advantages over the previously known blow molded plastic fuel tanks. These include the ability to fabricate the tank with internal components which cannot be satisfactorily done with the previously known blow molded plastic tanks. Furthermore, blow molded plastic tanks are not formed with two housing parts so that nesting of the housing parts with blow mold tanks is not possible. This in turn increases the transportation and shipping costs for the fuel tanks.

In the preferred embodiment of the invention, the laminate structure 40 has at least three layers, i.e. the abrasion resistant outer layer 42, the chemical resistant layer 50 and the vapor barrier layer 46. However, a two layer laminate structure 40 is also possible in which the vapor barrier layer 46 is combined with either the chemical resistant layer 50 or the outer layer 42. For example, the use of teflon as the chemical resistant layer 50 would also serve to act as a vapor barrier layer.

Having described our invention, however, many modifications thereto will become apparent to those skilled in the art to which it pertains without deviation from the spirit of the invention as defined by the scope of the appended claims.

We claim:

1. A fuel tank for a vehicle comprising:
   a first housing part having an outer peripheral flange and a central portion extending between and offset from said flange,
   a second housing part having an outer peripheral flange and a central portion extending between and offset from said flange,
   said flanges on said housing parts adapted to abut against each other so that a chamber is formed between said central portions of said housing parts,
   means for sealingly securing said flanges together,
   wherein the central portion of each housing part is a laminate structure comprising:
   an outer layer of uniform thickness constructed of a material resistant to impact and abrasion,
   a heat and light reflective layer adjacent said outer layer,
   a vapor barrier layer of uniform thickness constructed of a material impervious to hydrocarbon vapors adjacent said heat and light reflective layer, and
   a structural layer adjacent said vapor barrier layer for increasing the strength and rigidity of said fuel tank,
   a chemical resistant inner layer of uniform thickness constructed of a material resistant to erosion from hydrocarbons and conventional fuel additives,
   wherein said vapor barrier layer is sandwiched between said outer layer and said inner layer so that said laminate structure has a uniform thickness, and
   means for bonding said outer layer, said vapor barrier layer and said chemical resistant inner layer together.

2. The invention as defined in claim 1 wherein said outer layer of at least one housing part is light transmissive.

3. A fuel tank for a vehicle comprising:
   a first housing part having an outer peripheral flange and a central portion extending between and offset from said flange,
   a second housing part having an outer peripheral flange and a central portion extending between and offset from said flange,
   said flanges on said housing parts adapted to abut against each other so that a chamber is formed between said central portions of said housing parts,
   means for sealingly securing said flanges together,
   wherein the central portion of each housing part is a laminate structure comprising:
   an outer layer constructed of a material resistant to impact and abrasion, said outer layer being constructed of a light transmissive material,
   a light reflective metal layer adjacent said outer layer,
   wherein said light reflective metal layer reflects light passing inwardly though said outer layer back outwardly through said outer layer.

4. The invention as defined in claim 1 wherein said vapor barrier layer comprises teflon.

5. The invention as defined in claim 4 wherein said vapor barrier layer is between 1/1000 and 5/1000 inches thick.

6. The invention as defined in claim 1 wherein said outer layer comprises nylon 12.

7. The invention as defined in claim 1 wherein said outer layer comprises mylar.

8. The invention as defined in claim 1 wherein said outer layer comprises teflon.

9. The invention as defined in claim 1 wherein said outer layer comprises plastic.

10. The invention as defined in claim 1 wherein said outer layer includes materials for electrical conductivity.

11. The invention as defined in claim 1 wherein said outer layer comprises a non-flame supportive material.

12. The invention as defined in claim 1 wherein said outer layer is between 10/1000 and 50/1000 inches thick.

13. The invention as defined in claim 1 wherein baid chemical resistant layer comprises nylon 12.

14. The invention as defined in claim 1 wherein said chemical resistant layer comprises teflon.

15. The invention as defined in claim 1 wherein said chemical resistant layer is between 1/1000 and 5/1000 inches thick.

16. The invention as defined in claim 2 wherein said light and heat reflective layer comprises a metallic foil.

17. The invention as defined in claim 1 wherein said structural layer comprises nylon 6.

18. The invention as defined in claim 1 wherein said structural layer comprises polyethylene.

19. The invention as defined in claim 1 wherein said structural layer comprises polypropylene.

20. The invention as defined in claim 1 wherein said structural layer is between 20/1000 and 50/1000 inches thick.

21. The invention as defined in claim 1 and comprising a baffle positioned in said chamber, said baffle being sandwiched between said central portions of said housing parts.

22. The invention as defined in claim 1 and comprising a reservoir in said chamber.

23. The invention as defined in claim 1 wherein said securing means comprises a sonic weld.

24. The invention as defined in claim 1 wherein said securing means comprises a heat weld.

25. The invention as defined in claim 1 and comprising at least one support bracket in said chamber.

26. The invention as defined in claim 1 wherein said securing means comprises an adhesive.

27. The invention as defined in claim 1 wherein said securing means comprises a solvent weld.

28. The invention as defined in claim 1 wherein said securing means comprises a laser weld.

* * * * *